W. C. HOBART.
METHOD OF PATCHING WOODS.
APPLICATION FILED NOV. 19, 1908.

1,005,546.

Patented Oct. 10, 1911.

2 SHEETS—SHEET 1.

WITNESS:
W. B. Anderson.
I. H. Hill.

William C Hobart, INVENTOR

BY G. W. Bullard
ATTORNEY

W. C. HOBART.
METHOD OF PATCHING WOODS.
APPLICATION FILED NOV. 19, 1908.
1,005,546.
Patented Oct. 10, 1911.
2 SHEETS—SHEET 2.
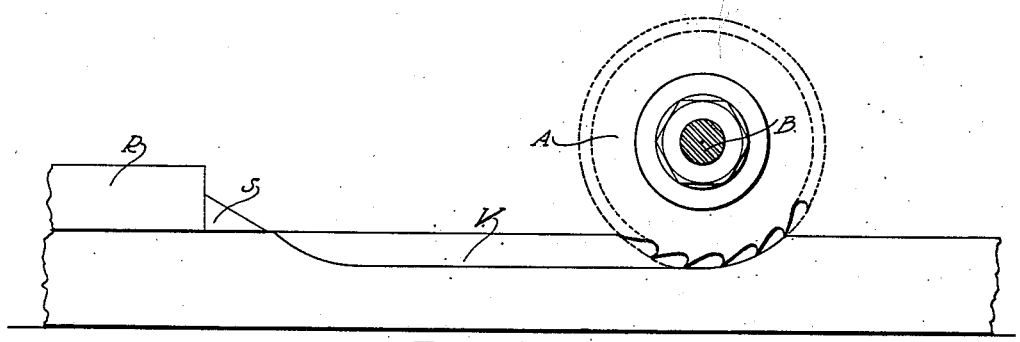
Fig. 4.
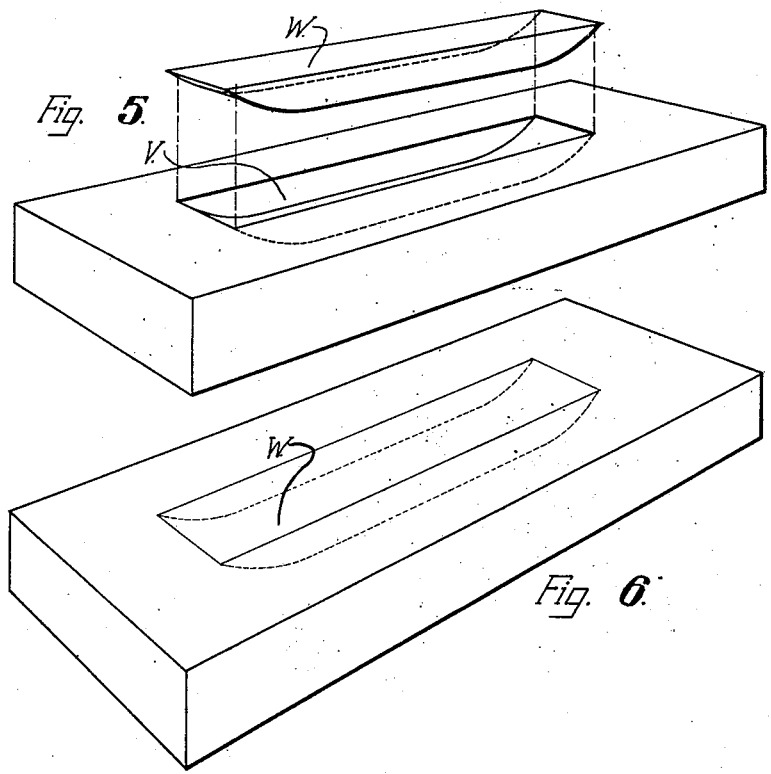
Fig. 5.
Fig. 6.
WITNESS:
W. B. Anderson.
J. H. Hill.
William C Hobart, INVENTOR
BY G. W. Bullard
ATTORNEY

UNITED STATES PATENT OFFICE.

WILLIAM C. HOBART, OF CHEHALIS, WASHINGTON, ASSIGNOR TO THE CHEHALIS FIR DOOR COMPANY, OF CHEHALIS, WASHINGTON.

METHOD OF PATCHING WOODS.

1,005,546.   Specification of Letters Patent.   Patented Oct. 10, 1911.

Application filed November 19, 1908. Serial No. 463,453.

*To all whom it may concern:*

Be it known that I, WILLIAM C. HOBART, a citizen of the United States, residing at Chehalis, in the county of Lewis and State of Washington, have invented certain new and useful Improvements in Methods of Patching Woods, of which the following is a specification.

My invention pertains to devices for patching wood where a pitch-pocket or any defects makes a patch necessary.

Figures 1, 2:
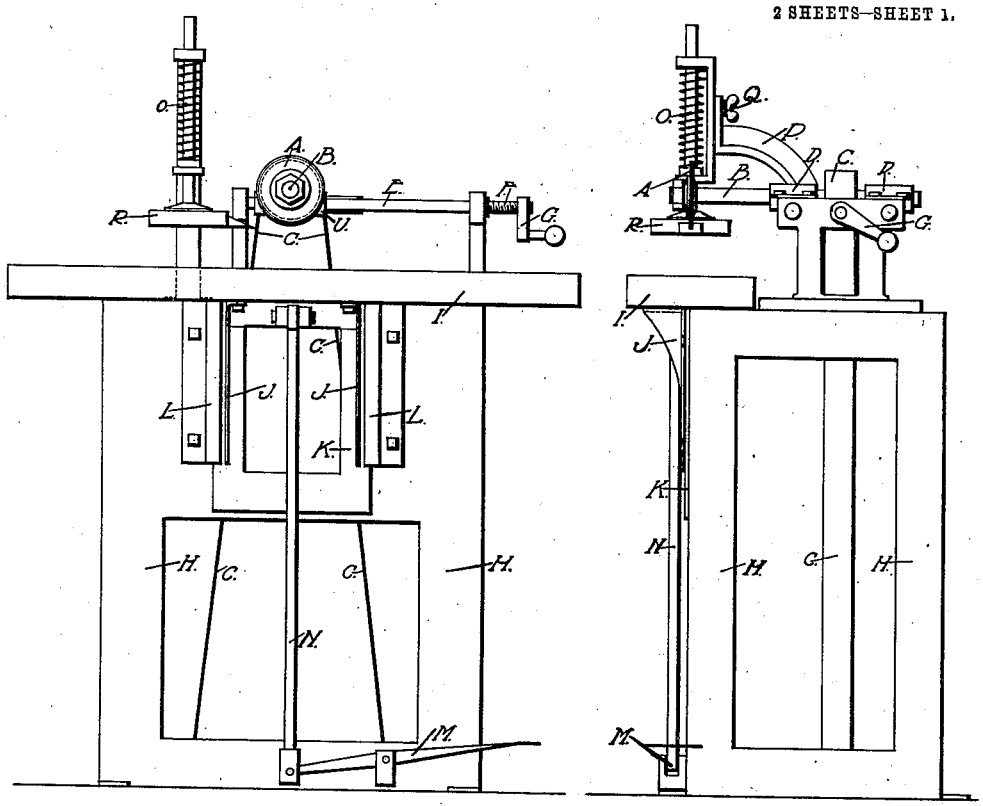
Figure 3:
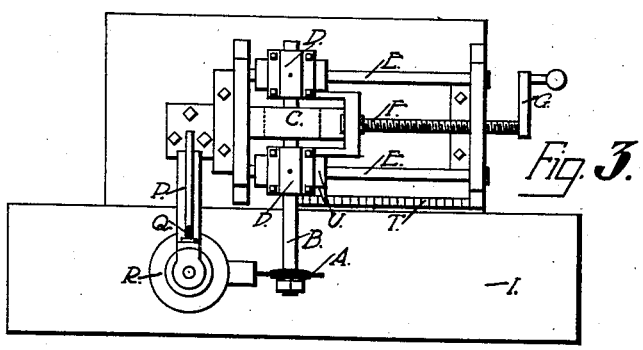

The objects of my invention are:—first, to provide a means whereby pieces of finish lumber having small surface defects may be made good, and utilized in the manufacture of doors and other wood finish materials; and second, to provide a method and means for removing a flaw or defect from the surface of wood, and so effectively replace the same with a piece of good wood as to practically make good the defect. I attain these objects by means of the mechanism and processes illustrated in the accompanying drawings in which, Figure 1 represents a side view of the buzz-saw machine designed to remove surface defects from wood. Fig. 2 is an end view of the same and Fig. 3 is a top view of the same. Fig. 4 represents the operation of the buzz-saw and the form of groove made in removing a flaw or defect. Fig. 5 represents the finished groove and the patch piece ready to be fitted therein, and Fig. 6 represents the patch in place and finished, making good the defect.

Similar letters refer to similar parts in the several views.

In the manufacture of doors and wood finish from Washington fir and other pitch-bearing woods, pieces of wood otherwise perfect, are frequently marred by pitch pockets or other defects, which, if not cut out, will render the same unfit for use. To cut out all these defects causes much waste of excellent material and a corresponding loss to the manufacturer. To patch them by hand, requires the expense of a skilled mechanic which often exceeds the value of the material saved. I obviate this loss and expense with my invention; I provide a machine whereby I remove the pitch-pocket or defect from the surface of the wood, replace the same with a machine formed patch block made to fit the opening and match the wood surface in quality and grain.

My newly invented machine for removing the defects comprises a buzz-saw A mounted on a shaft B and driven by the belt C. The shaft B turns in the bearings D D which are mounted to travel on the track rods E E. The travel is controlled by the screw F and crank G. This mechanism is all supported on the strong cast iron frame H H, which is securely anchored to the factory floor. A working table I is mounted on brackets J J, which are a part of a sliding frame K made to run in the guides L L, and is lifted by the foot lever M and upright staff N. By this means a piece of wood when laid on the table I is lifted into contact with the saw A. A spring clamp O, supported on the fixed arm P and made adjustable at the slide screw Q, and having a round foot R and chip breaker S, securely holds the piece of wood as it comes in contact with the saw A, as partially shown in Fig. 4.

To remove a defect, the piece of wood is laid on the table I and by means of the foot lever M the same is lifted into contact with the buzz-saw A. The clamp foot R, with the splinter shoe S is so adjusted as to clamp the wood and firmly hold the same before it comes to the saw. The chip breaker S stands out near the saw A and prevents the surface of the wood from splintering. When the table is raised until the saw is made to cut the required depth into the wood, the saw A is made to travel by means of the screw F and crank G until the defect is removed its full length. The travel of the saw is measured by the scale T and index U. By this scale T the groove V is cut by the saw A to fixed lengths, and the patch piece W is cut to corresponding length to fit them. When a groove is cut the required length to remove the defect as indicated at V, Figs. 4 and 5, a patch W to match the wood and fit the groove is selected, glued and pressed firmly in place, as shown in Fig. 6, and the defect is thus replaced by a patch that can be observed only by close examination. By this means and method I am enabled to patch a wood surface at a minimum cost, and in a manner that much otherwise waste material can be utilized.

It is to be observed that I do not limit myself to the widths and edge form of the buzz-saw A, but I reserve the right to use a saw of any width and with an edge of any desired form, square, oblique or pointed. I also reserve the right to use a corresponding form of wood patch. It is to be further observed that the form of wood patch is made mechanically with ends cut to the radius of the saw and of fixed lengths and widths to fit the grooves cut by the saw A by forming the oblong grooves with their opposite ends curved on a radius and the bottom of the grooves substantially straight, the possibility of the wood filling piece shifting in position is prevented and a closer joint at the point of juncture between the filling piece and the body of the wood is made possible.

Having described my invention, what I claim as new and desire to secure by Letters Patent is:—

1. The method of patching wood containing pitch-pockets consisting in mechanically cutting-out the pitch-pocket portion and forming in the portion of the wood from which said removal is made an oblong cavity or groove having oppositely disposed end-walls curved on a radius and a base between said ends substantially straight to prevent shifting of a filling-piece, and securing in said cavity or groove a wood filling-piece having its inner face at opposite ends curved on a radius and the portion intermediate of said ends formed substantially straight, said ends and intermediate portion conforming to the corresponding portions of the oblong formed cavity substantially as described.

2. The method of patching wood containing pitch-pockets consisting in mechanically cutting-out the pitch-pocket portion and forming in the portion of the wood from which said removal is made an oblong cavity or groove having parallel substantially straight side-walls, oppositely disposed end-walls curved on a radius and a base between said end-walls substantially straight to prevent shifting of a filling-piece, and securing in said cavity or groove a wood filling-piece having its inner face at opposite ends curved on a radius and the portion intermediate of said ends formed substantially straight, said ends and intermediate portion conforming to the corresponding portions of the oblong formed cavity, substantially as described.

3. An apparatus for simultaneously removing defective portions of wood and forming a cavity to receive a filling to replace the removed portions, comprising a vertically movable support for the wood to be acted upon, a traveling carriage, a rotatable circular cutter supported on the carriage, and a spring depressed clamp carrying a chip-breaker to press upon the surface of the wood adjacent to the point of final action of the cutter on the wood, the bearing surface of said clamp and chip-breaker being normally below the lowest cutting-edge of the cutter, substantially as described.

In testimony whereof I affix my signature in presence of two witnesses.

WILLIAM C. HOBART.

Witnesses:
H. C. Coffman,
E. M. Coffman.